(12) United States Patent
Shi et al.

(10) Patent No.: US 12,186,700 B2
(45) Date of Patent: Jan. 7, 2025

(54) INTEGRATED DEVICE FOR ADSORPTIVE PURIFICATION AND CATALYTIC REGENERATION OF VOLATILE ORGANIC COMPOUNDS

(71) Applicant: BEIJING MUNICIPAL RESEARCH INSTITUTE OF ENVIRONMENTAL PROTECTION, Beijing (CN)

(72) Inventors: Aijun Shi, Beijing (CN); Lei Nie, Beijing (CN); Wanqing He, Beijing (CN)

(73) Assignees: Beijing Vehicle Emissions Management Center, Beijing (CN); Beijing Municipal Research Institute of Eco-Environmental Protection, Beijing (CN)

( * ) Notice: Subject to any disclaimer, the term of this patent is extended or adjusted under 35 U.S.C. 154(b) by 537 days.

(21) Appl. No.: 17/617,816

(22) PCT Filed: Jun. 17, 2021

(86) PCT No.: PCT/CN2021/100607
§ 371 (c)(1),
(2) Date: Dec. 9, 2021

(87) PCT Pub. No.: WO2022/057347
PCT Pub. Date: Mar. 24, 2022

(65) Prior Publication Data
US 2023/0294034 A1    Sep. 21, 2023

(30) Foreign Application Priority Data

Sep. 15, 2020    (CN) .................. 202010971082.X (51) Int. Cl.
*B01D 53/04*    (2006.01)
*B01D 53/34*    (2006.01)
(Continued)

(52) U.S. Cl.
CPC ..... *B01D 53/0438* (2013.01); *B01D 53/0454* (2013.01); *B01D 53/346* (2013.01);
(Continued)

(58) Field of Classification Search
CPC ............ B01D 53/0438; B01D 53/0454; B01D 53/346; B01D 53/8687; F23G 7/063; F23G 7/07
(Continued)

(56) References Cited

U.S. PATENT DOCUMENTS

| | | | | |
|---|---|---|---|---|
| 4,350,504 A | * | 9/1982 | Diachuk | F24C 15/20 126/299 C |
| 5,477,810 A | * | 12/1995 | Wilkison, III | A01K 31/06 119/459 |
| 6,270,336 B1 | * | 8/2001 | Terashima | F23C 6/04 431/11 |

* cited by examiner

*Primary Examiner* — Vivek K Shirsat
(74) *Attorney, Agent, or Firm* — Fresh IP PLC; Clifford D. Hyra; Aubrey Y. Chen (57) ABSTRACT

The integrated device for adsorptive purification and catalytic regeneration of VOCs is provided and includes a filtration adsorption coupling filter, a catalytic combustion regeneration box and a housing, where the housing includes a filter inner cavity and a combustion inner cavity that are communicated in sequence. The VOC exhaust gas is adsorbed and filtered by the filtration adsorption coupling filter. Moreover, under an operating condition of desorption regeneration, the catalytic combustion regeneration box is utilized to perform thermal desorption and regeneration on the filtration adsorption coupling filter, and catalytically combust and purify the VOC exhaust gas obtained by thermal desorption.

9 Claims, 7 Drawing Sheets

(51) Int. Cl.
*B01D 53/86* (2006.01)
*F23G 7/06* (2006.01)
*F23G 7/07* (2006.01)

(52) U.S. Cl.
CPC ......... *B01D 53/8687* (2013.01); *F23G 7/063* (2013.01); *F23G 7/07* (2013.01); *B01D 2257/708* (2013.01); *B01D 2258/0283* (2013.01); *F23G 2209/14* (2013.01)

(58) Field of Classification Search
USPC .......................................................... 431/13
See application file for complete search history.

INTEGRATED DEVICE FOR ADSORPTIVE PURIFICATION AND CATALYTIC REGENERATION OF VOLATILE ORGANIC COMPOUNDS

CROSS REFERENCE TO RELATED APPLICATION(S)

This patent application is a national stage application of International Patent Application No. PCT/CN2021/100607, filed on Jun. 17, 2021, which claims the benefit and priority of Chinese Patent Application No. 202010971082.X filed on Sep. 15, 2020, both of which are incorporated by reference herein in its entirety as part of the present application.

TECHNICAL FIELD

The present disclosure relates to the technical field of exhaust gas purification, and in particular, to an integrated device for adsorptive purification and catalytic regeneration of volatile organic compounds (VOCs).

BACKGROUND ART

VOCs are defined in physics as organic compounds with a vapor pressure greater than or equal to 0.01 KPa at 20° C. From the perspective of air pollution prevention, VOCs refer to organic compounds that participate in photochemical reaction in atmosphere, or organic compounds that are determined through measurement or calculation according to a prescribed method.

To improve VOCs purification efficiency, most of existing VOCs prevention and treatment devices are implemented through series integration of different purification technologies such as pyrolysis, adsorption, and photocatalysis. Built devices for VOCs adsorptive purification mostly use segmented combination or split regeneration technology routes and have technical problems such as large volume, large pressure drop, difficulty in on-site regeneration technology and high operation and maintenance costs.

SUMMARY

An objective of some embodiments is to provide an integrated device for adsorptive purification and catalytic regeneration of VOCs, so as to alleviate the following technical problems in the prior art: large volume, difficulty in on-site regeneration technology and high operation and maintenance costs caused by segmented combination or split regeneration technology routes for VOCs prevention and control devices.

The integrated device for adsorptive purification and catalytic regeneration of VOCs provided by the present disclosure includes a filtration adsorption coupling filter, a catalytic combustion regeneration box and a housing;

the housing comprises a filter inner cavity and a combustion inner cavity that are communicated in sequence, the housing is used for closed circulation of VOC exhaust gas, the filtration adsorption coupling filter is arranged in the filter inner cavity; the filtration adsorption coupling filter is configured to adsorb and filter the VOC exhaust gas, and the catalytic combustion regeneration box is located in the combustion inner cavity and configured to perform thermal desorption and regeneration on the filtration adsorption coupling filter and catalytically combust and purify the VOC exhaust gas obtained by the thermal desorption.

In a preferred embodiment of the present disclosure, the housing further includes an air inlet and an air outlet; and
the air inlet is communicated with the filter inner cavity; the air inlet is configured to convey received VOC exhaust gas to the filter inner cavity; the air outlet is communicated with the combustion inner cavity; the air outlet is configured to discharge a gas that flows through the filtration adsorption coupling filter and the catalytic combustion regeneration box so as to be purified.

In a preferred embodiment of the present disclosure, the catalytic combustion regeneration box includes a box body, a recycling fan and a regeneration mechanism;
the regeneration mechanism is located in the box body, a catalyst is arranged in the regeneration mechanism, and the regeneration mechanism is configured to heat the catalyst and the VOC exhaust gas, so as to perform thermal desorption and regeneration on the filtration adsorption coupling filter via heated VOC exhaust gas, and catalytically combust and decompose the VOC exhaust gas via the heated catalyst; and
the recycling fan is located outside the housing, and the recycling fan is communicated with an inside of the box body, and is configured to convey desorbed VOC exhaust gas into the box body.

In a preferred embodiment, the regeneration mechanism includes an electric heating mechanism and a catalytic combustion section; and
the electric heating mechanism and the catalytic combustion section are arranged in series at an interval, and the electric heating mechanism is configured to heat the catalytic combustion section.

In a preferred embodiment of the present disclosure, the catalytic combustion section includes a plurality of catalytic combustion layers;
the electric heating mechanism is arranged between any two catalytic combustion layers of the plurality of catalytic combustion layers; and
outsides of the plurality of catalytic combustion layers are coated with the catalyst.

In a preferred embodiment of the present disclosure, the integrated device for adsorptive purification and catalytic regeneration of VOCs further includes a check valve, where
the check valve is located at an outlet of the box body; the check valve is configured to limit a conveying direction of the catalytic combustion regeneration box to the filtration adsorption coupling filter.

In a preferred embodiment of the present disclosure, the integrated device for adsorptive purification and catalytic regeneration of VOCs further includes a fireproof heat exchange section, where
the fireproof heat exchange section is located inside the box body and between the check valve and the catalytic combustion section.

In a preferred embodiment of the present disclosure, the filtration adsorption coupling filter includes a filter body and an adsorption filtration mechanism;
the adsorption filtration mechanism is arranged inside the filter body and configured to adsorb and filter the VOC exhaust gas; and
the adsorption filtration mechanism comprises a first fixing mesh, an adsorption filtration layer and a second fixing mesh that are sequentially connected; and the adsorption filtration layer is located between the first fixing mesh and the second fixing mesh.

In a preferred embodiment of the present disclosure, the filter inner cavity includes a first inner cavity and a second inner cavity that are communicated with each other, the housing comprises an air inlet and an air outlet, an inlet of the first inner cavity is communicated with the air inlet, and an outlet of the second inner cavity is communicated with the air outlet; and the housing is internally provided with a plurality of filter mounting holes corresponding to the first inner cavity, the filtration adsorption coupling filter comprises a plurality of filtration adsorption coupling filters; and the filtration adsorption coupling filters are mounted in the filter mounting holes in a one-to-one correspondence mode, so that VOCs to be purified enter from the air inlet, pass through the plurality of filtration adsorption coupling filters, then flow through the second inner cavity and are discharged through the air outlet.

In a preferred embodiment of the present disclosure, the integrated device for adsorptive purification and catalytic regeneration of VOCs further includes a control device, a differential pressure detection device, a catalytic temperature detection device, a flue gas temperature detection device and an alarm device, where the differential pressure detection device, the catalytic temperature detection device, the flue gas temperature detection device and the alarm device are connected to the control device via electrical signals, the differential pressure detection device is arranged in the filter inner cavity and located at an air outlet end of the filtration adsorption coupling filter and configured to detect and output a signal on a pressure drop difference in the filter inner cavity to the control device, the flue gas temperature detection device is arranged at an air outlet end of the filter inner cavity and configured to measure a temperature of exhaust gas and transmit information for a temperature of exhaust gas to the control device, and the catalytic temperature detection device is arranged at an air outlet end of the combustion inner cavity and configured to measure a temperature of the catalyst and transmit information for a temperature of the catalyst to the control device; and the control device is connected to the catalytic combustion regeneration box and the alarm device via electrical signals, and the control device is configured to control states of the catalytic combustion regeneration box and the alarm device according to the signal on the pressure drop difference in the filter inner cavity and the information for the temperature of exhaust gas.

The integrated device for adsorptive purification and catalytic regeneration of VOCs provided by the present disclosure includes a filtration adsorption coupling filter, a catalytic combustion regeneration box and a housing, where the housing includes a filter inner cavity and a combustion inner cavity that are communicated in sequence. The housing is used for closed circulation of VOC exhaust gas. The filtration adsorption coupling filter is arranged in the filter inner cavity. The catalytic combustion regeneration box is arranged in the combustion inner cavity. The VOC exhaust gas is adsorbed and filtered by the filtration adsorption coupling filter. Moreover, under an operating condition of desorption regeneration, the catalytic combustion regeneration box is utilized to perform thermal desorption and regeneration on the filtration adsorption coupling filter, and catalytically combust and purify the VOC exhaust gas obtained by thermal desorption. High-density synergistic purification integration of two technologies is implemented. The integrated device for adsorptive purification and catalytic regeneration of VOCs has technical effects of compact structure, high purification efficiency, recyclability, low secondary pollution, low costs and good economic benefits, and alleviates the following technical problems in the prior art: large volume, difficulty in on-site regeneration technology and high operation and maintenance costs caused by segmented combination or split regeneration technology routes for VOCs prevention and treatment devices.

BRIEF DESCRIPTION OF THE DRAWINGS

To describe specific implementations of the present disclosure or the technical solutions in the prior art more clearly, the following briefly describes the accompanying drawings required for describing the specific implementations or the prior art. Apparently, the accompanying drawings in the following description show merely some implementations of the present disclosure. A person of ordinary skill in the art may further derive other accompanying drawings from these accompanying drawings without creative efforts.

Reference numerals in the drawings: 100 filtration adsorption coupling filter; 101 filter body; 102 adsorption filtration mechanism; 112 first fixing mesh; 122 adsorption filtration layer; 132 second fixing mesh; 200 catalytic combustion regeneration box; 201 box body; 202 recycling fan; 203 regeneration mechanism; 213 electric heating mechanism; 223 catalytic combustion section; 204 check valve; 205 fireproof heat exchange section; 300 housing; 301 filter inner cavity; 311 first inner cavity; 321 second inner cavity; 302 air inlet; 303 air outlet; 400 control device; 401 differential pressure detection device; 402 catalytic temperature detection device; 403 flue gas temperature detection device; and 404 alarm device.

DETAILED DESCRIPTION OF THE EMBODIMENTS

To make the objectives, technical solutions and advantages of the embodiments of the present disclosure clearer, the following clearly and completely describes the technical solutions in the embodiments of the present disclosure with reference to accompanying drawings in the embodiments of the present disclosure. Apparently, the described embodiments are some rather than all of the embodiments. Components of the embodiments of the present disclosure generally described and illustrated in the accompanying drawings herein may be arranged and designed in various different configurations.

Therefore, the following detailed description of the embodiments of the present disclosure provided in the accompanying drawings is not intended to limit the claimed scope of the present disclosure, but merely represents selected embodiments of the present disclosure. All other embodiments obtained by a person of ordinary skill in the art based on the embodiments of the present disclosure without creative efforts shall fall within the protection scope of the present disclosure.

It should be noted that similar reference numerals and letters indicate similar terms in the following accompanying drawings. Therefore, once a certain term is defined in one accompanying drawing, it does not need to be further defined and explained in the subsequent accompanying drawings.

In the description of the present disclosure, it should be noted that orientations or position relationships indicated by terms "center", "top", "bottom", "left", "right", "vertical", "horizontal", "inner", "outer", etc. are based on the orientation or position relationships shown in the accompanying drawings, or the orientation or position relationships shown when products of the present disclosure are usually placed in use. The terms are just used to facilitate description of the present disclosure and simplify the description, but not to indicate or imply that the mentioned device or elements must have a specific orientation and must be constructed and operated in a specific orientation. Thus, these terms cannot be understood as a limitation to the present disclosure. Moreover, the terms such as "first", "second" and "third" are merely used to distinguish expressions and cannot be understood as indicating or implying relative importance.

In addition, the terms such as "horizontal" and "vertical" do not mean that a component is required to be absolutely horizontal or overhanging, but may be slightly inclined. For example, "horizontal" only means that a direction of a structure is more horizontal than "vertical", and does not mean that the structure must be completely horizontal, but may be slightly inclined.

In the description of the present disclosure, it should also be noted that, unless otherwise specified and defined clearly, the terms "arrange", "mount", "connected to", "connect", etc. should be understood in a broad sense, for example, the connection may be fixed connection, or detachable connection, or integrated connection; or mechanical connection, or electric connection; or direct connection, or indirect connection through an intermediate medium, or internal communication between two elements. For a person of ordinary skill in the art, the specific meanings of the above-mentioned terms in the present disclosure may be understood according to specific conditions.

It should be noted that in photochemical definition, VOCs refer to organic compounds that participate in photochemical reaction in atmosphere, or organic compounds that are determined through measurement or calculation according to a prescribed method. Generally, VOCs include non-methane hydrocarbons (alkanes, alkenes, alkynes, aromatic hydrocarbons, etc.), oxygen-containing organics (aldehydes, ketones, alcohols, ethers, etc.), chlorine-containing organics, nitrogen-containing organics, sulfur-containing organics, etc. The VOCs are an important precursor for the formation of ozone (O3) and fine particulate matter (PM2.5) pollution. VOCs are the second most widely distributed and species-complex air pollutants next to particulate matter, and have hazards to an ecological environment system and human health mainly in three aspects: first, some species are toxic and carcinogenic, and endanger human health; second, VOCs participate in the photochemical reaction in atmosphere with nitrogen oxides to cause ozone pollution; and third, VOCs form secondary aerosols through chemical reactions, which are an important precursor for forming fine particulate matter (PM2.5). Controlling and reducing emissions of VOCs from various pollution sources is an important way to reduce concentration levels of atmospheric ozone and PM2.5 and improve air quality.

As shown in FIG. 1 to FIG. 6, an integrated device for adsorptive purification and catalytic regeneration of VOCs provided by this embodiment includes: a filtration adsorption coupling filter 100, a catalytic combustion regeneration box 200 and a housing 300. The housing 300 includes a filter inner cavity 301 and a combustion inner cavity that are communicated in sequence. The housing 300 is used for closed circulation of VOC exhaust gas. The filtration adsorption coupling filter 100 is arranged in the filter inner cavity 301 and used to adsorb and filter the VOC exhaust gas. The catalytic combustion regeneration box 200 is located in the combustion inner cavity and used to perform thermal desorption and regeneration on the filtration adsorption coupling filter 100 and catalytically combust and purify the VOC exhaust gas obtained by thermal desorption.

It should be noted that the integrated device for adsorptive purification and catalytic regeneration of VOCs provided in this embodiment is suitable for purification treatment of low-concentration, high-gas-volume, and intermittently-discharged VOC exhaust gas. The integrated device for adsorptive purification and catalytic regeneration of VOCs has two operating conditions which are as follows: the filtration adsorption coupling filter 100 is utilized to adsorb VOCs; and then the catalytic combustion regeneration box 200 is utilized to perform thermal desorption and regeneration on the adsorption filtration layer 122 of the filtration adsorption coupling filter 100 during an interval when discharge of the exhaust gas is stopped, and catalytically combust and purify the VOC exhaust gas obtained by thermal desorption, which realizes high-density synergistic purification integration of two technologies, and obtains the integrated device for purification and catalytic regeneration.

Optionally, the housing 300 is used as an accommodating space, where the filter inner cavity 301 and the combustion inner cavity are used as spaces for storing the filtration adsorption coupling filter 100 and the catalytic combustion regeneration box 200. The VOC exhaust gas is circulated inside the housing 300, so that the VOC exhaust gas can be adsorbed by the filtration adsorption coupling filter 100. The VOC exhaust gas is thermally catalytically combusted and purified by using the catalytic combustion regeneration box 200 during the interval when discharge of the exhaust gas is stopped.

Figure 6:
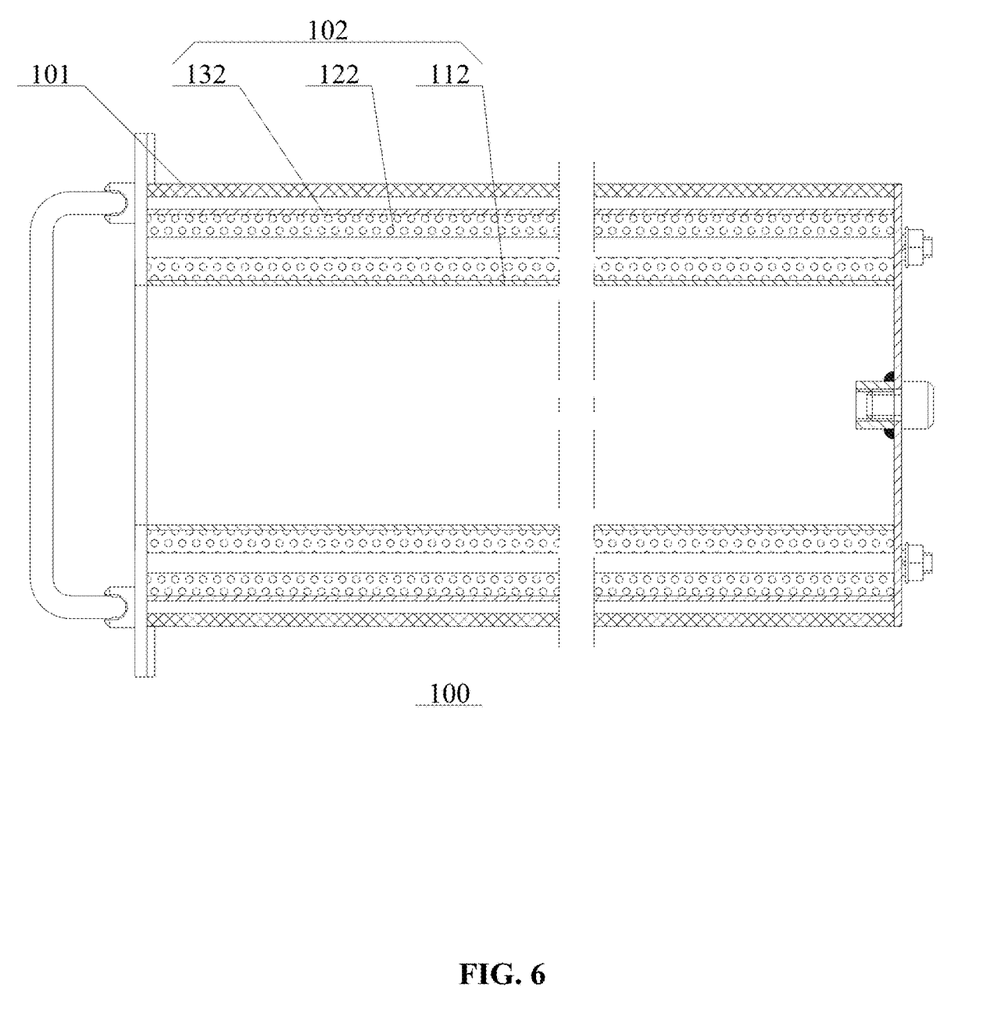
FIG. 6 is a schematic structural diagram of a filtration adsorption coupling filter of the integrated device for adsorptive purification and catalytic regeneration of VOCs according to an embodiment of the present disclosure.

In a preferred embodiment of the present disclosure, the filtration adsorption coupling filter 100 includes a filter body 101 and an adsorption filtration mechanism 102. The adsorption filtration mechanism 102 is arranged inside the filter body 101. The adsorption filtration mechanism 102 is used to adsorb and filter VOC exhaust gas. The adsorption filtration mechanism 102 includes a first fixing mesh 112, an adsorption filtration layer 122 and a second fixing mesh 132 that are sequentially connected. The adsorption filtration layer 122 is located between the first fixing mesh 112 and the second fixing mesh 132.

The filter body 101 includes a porous catalytic sleeve. The porous catalytic sleeve is configured into a circular or circular folded structure and has a porosity greater than or equal to 30%. The porous catalytic sleeve has a porosity that is generally not less than 30%.

Optionally, a base material of the porous catalytic sleeve may be made of porous heat-resistant materials such as foam ceramics, honeycomb ceramics, microporous metal honeycomb panels, and glass fibers.

In this embodiment, the first fixing mesh 112 is an inner fixing mesh for fixing the adsorption filtration mechanism 102. The second fixing mesh 132 and the first fixing mesh 112 clamp the adsorption filtration mechanism 102 therebetween. The first fixing mesh 112 and the second fixing mesh 132 are provided with through holes, through which the VOC exhaust gas passes so as to be adsorbed by the adsorption filtration mechanism 102.

In a preferred embodiment of the present disclosure, the adsorption filtration mechanism 102 includes an activated carbon filter layer or a molecular sieve filter layer. The activated carbon filter layer includes at least one selected from the group consisting of granular activated carbon, honeycomb activated carbon, hollow columnar activated carbon and activated carbon fiber filter cotton. The molecular sieve filter layer includes at least one selected from the group consisting of a granular molecular sieve, a honeycomb molecular sieve and a hollow cylindrical molecular sieve.

Optionally, the adsorption filtration mechanism 102 may be provided with multiple filter layers. The filter layers of the multi-layer adsorption filtration mechanism 102 may be made of different materials, so as to adsorb VOCs more comprehensively.

In a preferred embodiment of the present disclosure, the integrated device for adsorptive purification and catalytic regeneration of VOCs further includes a handle cover plate and an end cover sealing plate that are oppositely arranged. The handle cover plate is located at one end of the filter body 101. The end cover sealing plate is located at the other end of the filter body 101. The handle cover plate and the end cover sealing plate are separately connected to the filter body 101.

The integrated device for adsorptive purification and catalytic regeneration of VOCs provided in this embodiment includes the filtration adsorption coupling filter 100, the catalytic combustion regeneration box 200 and the housing 300. The housing 300 includes the filter inner cavity 301 and the combustion inner cavity that are communicated in sequence. The housing 300 is used for closed circulation of VOC exhaust gas. The filtration adsorption coupling filter 100 is arranged in the filter inner cavity 301. The catalytic combustion regeneration box 200 is arranged in the combustion inner cavity. The VOC exhaust gas is adsorbed and filtered by the filtration adsorption coupling filter 100. Moreover, under an operating condition of desorption regeneration, the catalytic combustion regeneration box 200 is utilized to perform thermal desorption and regeneration on the filtration adsorption coupling filter 100, and catalytically combust and purify the VOC exhaust gas obtained by thermal desorption. High-density synergistic purification integration of two technologies is implemented. The integrated device for adsorptive purification and catalytic regeneration of VOCs has technical effects of compact structure, high purification efficiency, recyclability, low secondary pollution, low costs and good economic benefits, and alleviates the following technical problems in the prior art: large volume, difficulty in on-site regeneration technology and high operation and maintenance costs caused by segmented combination or split regeneration technology routes for VOCs prevention and treatment devices.

Figure 1:
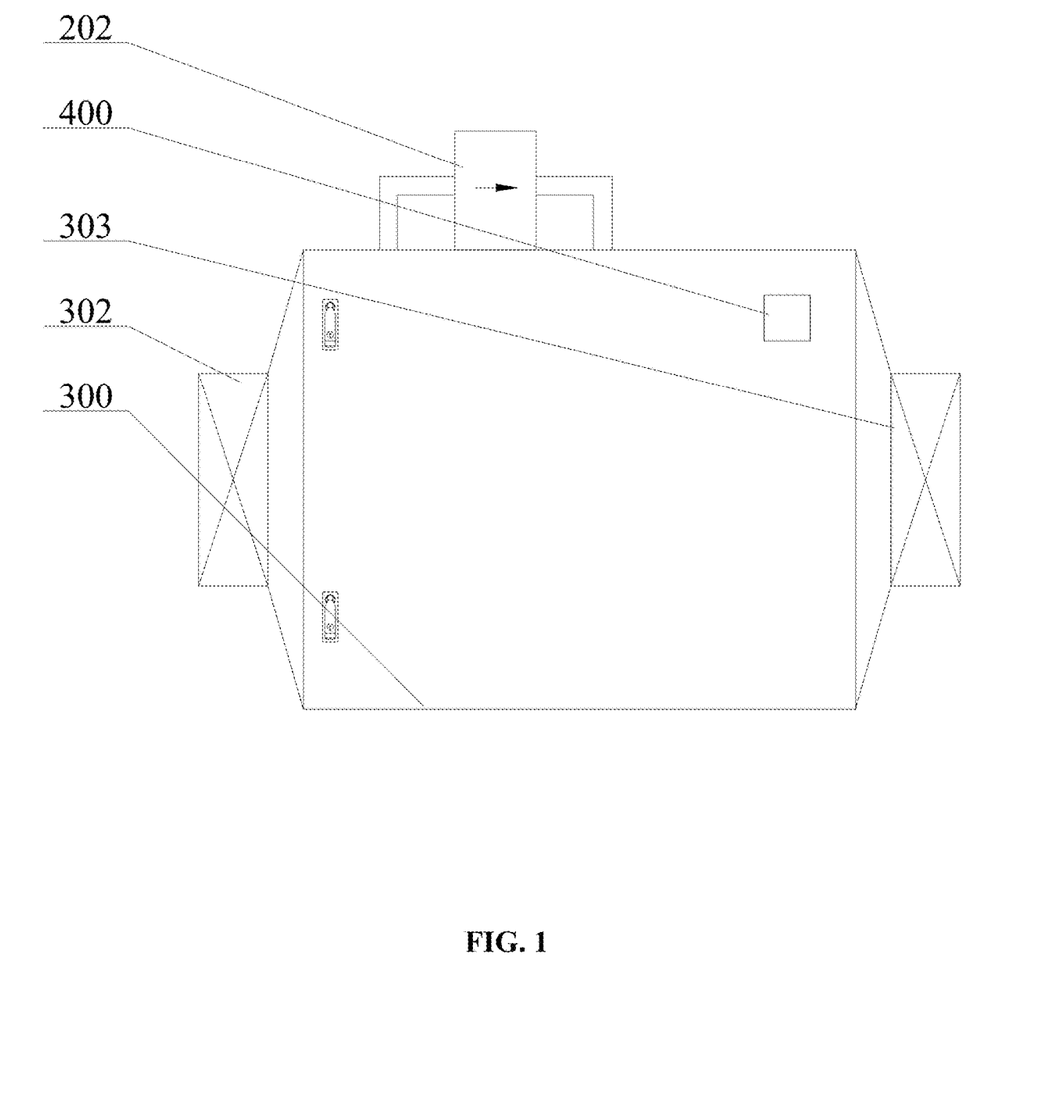
FIG. 1 is a schematic diagram of an overall structure of an integrated device for adsorptive purification and catalytic regeneration of VOCs according to an embodiment of the present disclosure.
Figure 2:
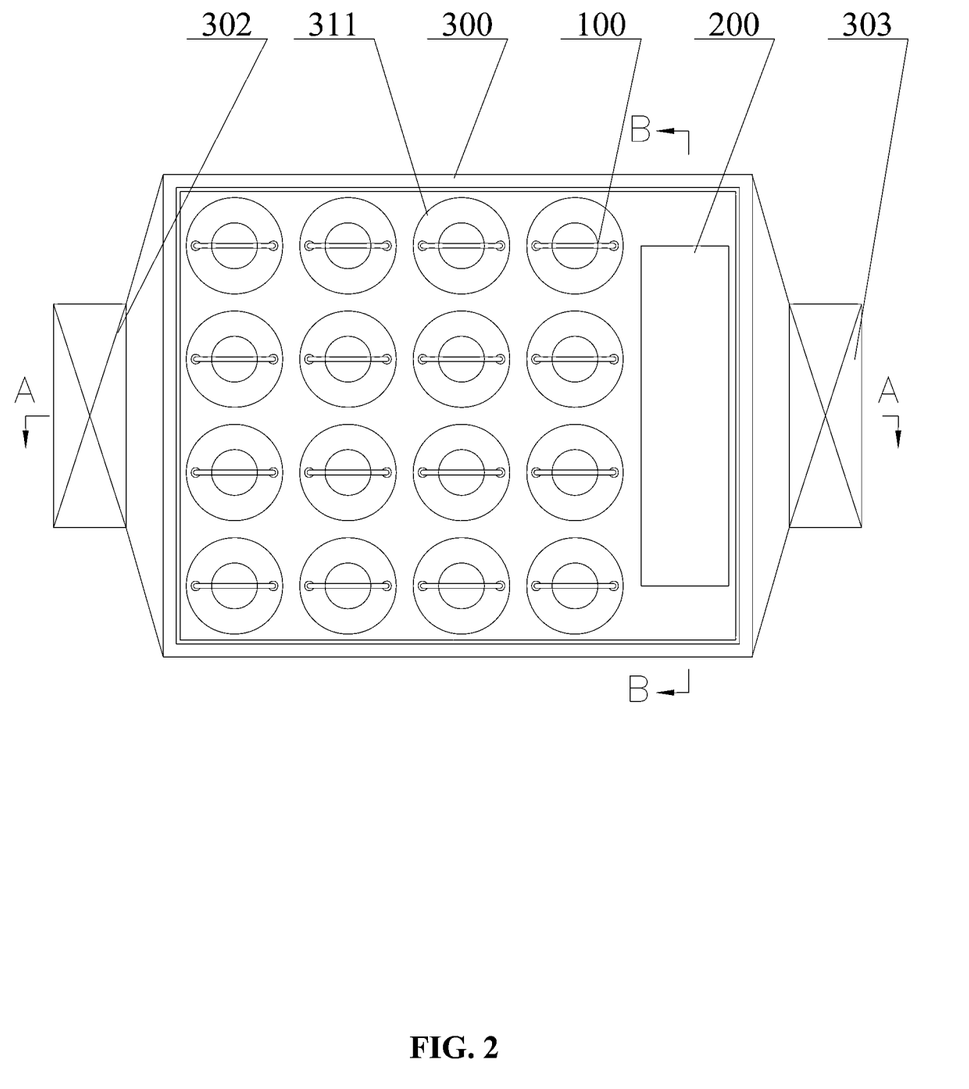
FIG. 2 is a schematic diagram of an internal structure of the integrated device for adsorptive purification and catalytic regeneration of VOCs according to an embodiment of the present disclosure.

On the basis of the foregoing described embodiment, further, in a preferred embodiment of the present disclosure, the housing 300 further includes an air inlet 302 and an air outlet 303. The air inlet 302 is communicated with the filter inner cavity 301. The air inlet 302 is used to convey received VOC exhaust gas to the filter inner cavity 301. The air outlet 303 is communicated with the combustion inner cavity. The air outlet 303 is used to discharge a gas that flows through the filtration adsorption coupling filter 100 and the catalytic combustion regeneration box 200 so as to be purified.

The inside of the housing 300 is used as an accommodating space for circulating VOC exhaust gas. The filter inner cavity 301 for mounting the filtration adsorption coupling filter 100 and the combustion inner cavity for mounting the catalytic combustion regeneration box 200 are distinguished. In this embodiment, the filter inner cavity 301 is distinguished from the combustion inner cavity by distinguishing regions. Moreover, the catalytic combustion regeneration box 200 is arranged at the air outlet 303, and the filtration adsorption coupling filter 100 is arranged at the air outlet 303, so that when entering the housing 300, the VOC exhaust gas will be first be adsorbed by the filtration adsorption coupling filter 100.

In addition, the positions of the combustion inner cavity and the filter inner cavity 301 may alternatively be implemented in other ways. For example, the combustion inner cavity is arranged in the middle of the filter inner cavity 301, so that the catalytic combustion regeneration box 200 is able to be located in the middle among multiple filtration adsorption coupling filters 100. Thus a high-temperature gas output from the catalytic combustion regeneration box 200 is used to perform thermal desorption and regeneration on the filtration adsorption coupling filters 100.

Figure 5:
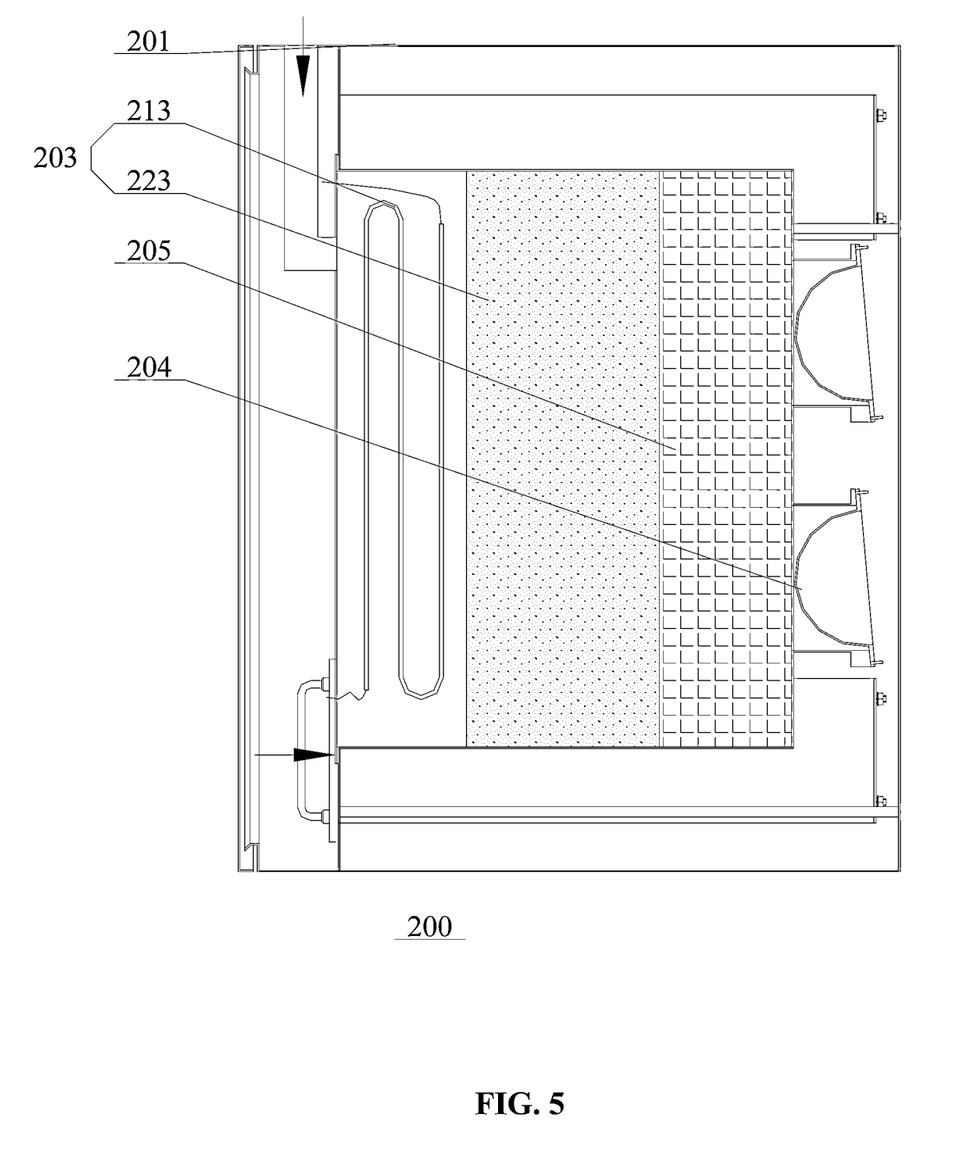
FIG. 5 is a schematic sectional view of a structure of the integrated device for adsorptive purification and catalytic regeneration of VOCs provided in the embodiment of FIG. 2 along a B-B direction.

In a preferred embodiment of the present disclosure, the filter inner cavity 301 includes a first inner cavity 311 and a second inner cavity 321 that are communicated with each other. The housing 300 includes an air inlet 302 and an air outlet 303. An inlet of the first inner cavity 311 is communicated with the air inlet 302. An outlet of the second inner cavity 321 is communicated with the air outlet 303. The housing 300 is internally provided with multiple filter mounting holes corresponding to the first inner cavity 311. Multiple filtration adsorption coupling filters 100 are provided, and the filtration adsorption coupling filters 100 are mounted in the filter mounting holes in a one-to-one correspondence mode, so that VOCs to be purified enter from the air inlet 302, pass through the multiple filtration adsorption coupling filters 100, then flow through the second inner cavity 321 and are discharged through the air outlet 303.

Figure 3:
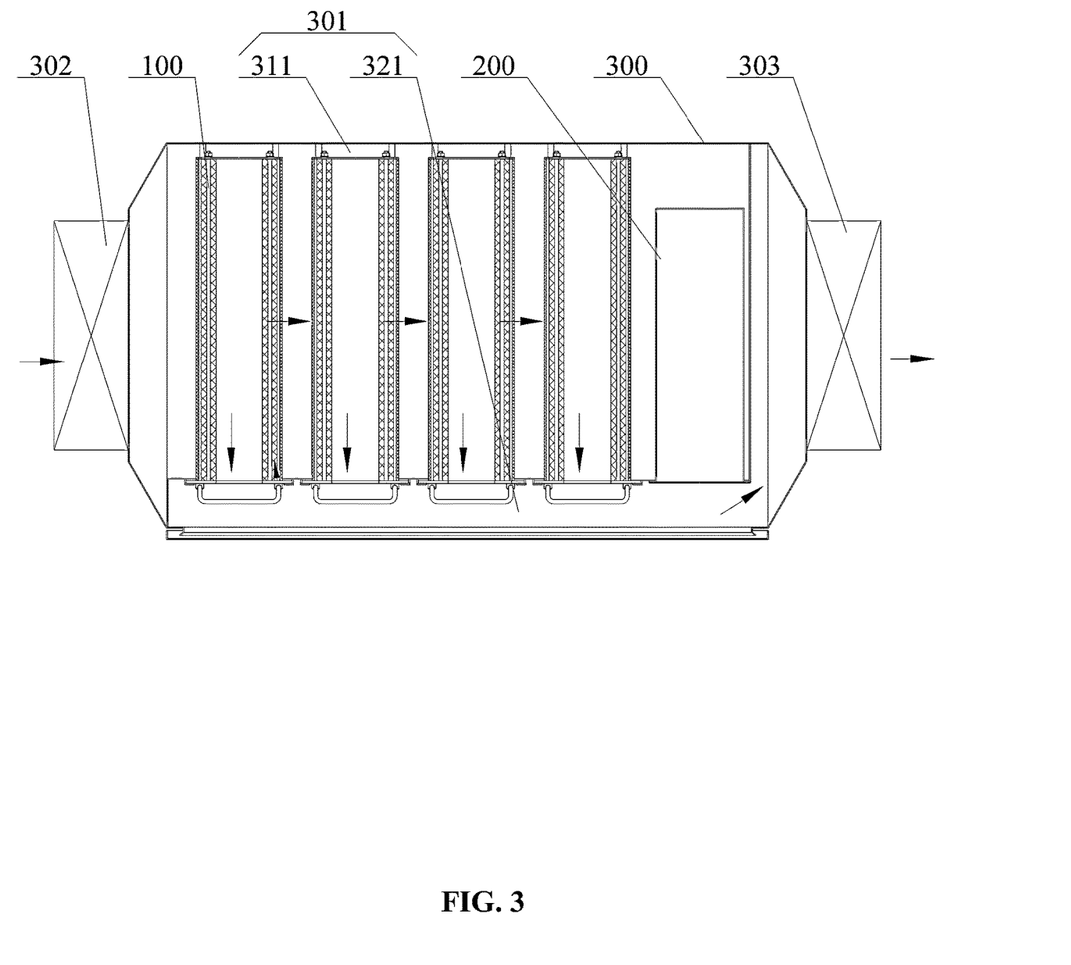
FIG. 3 is a schematic sectional view of one exemplary structure of the integrated device for adsorptive purification and catalytic regeneration of VOCs according to the embodiment of FIG. 2 along an A-A direction.
Figure 4:
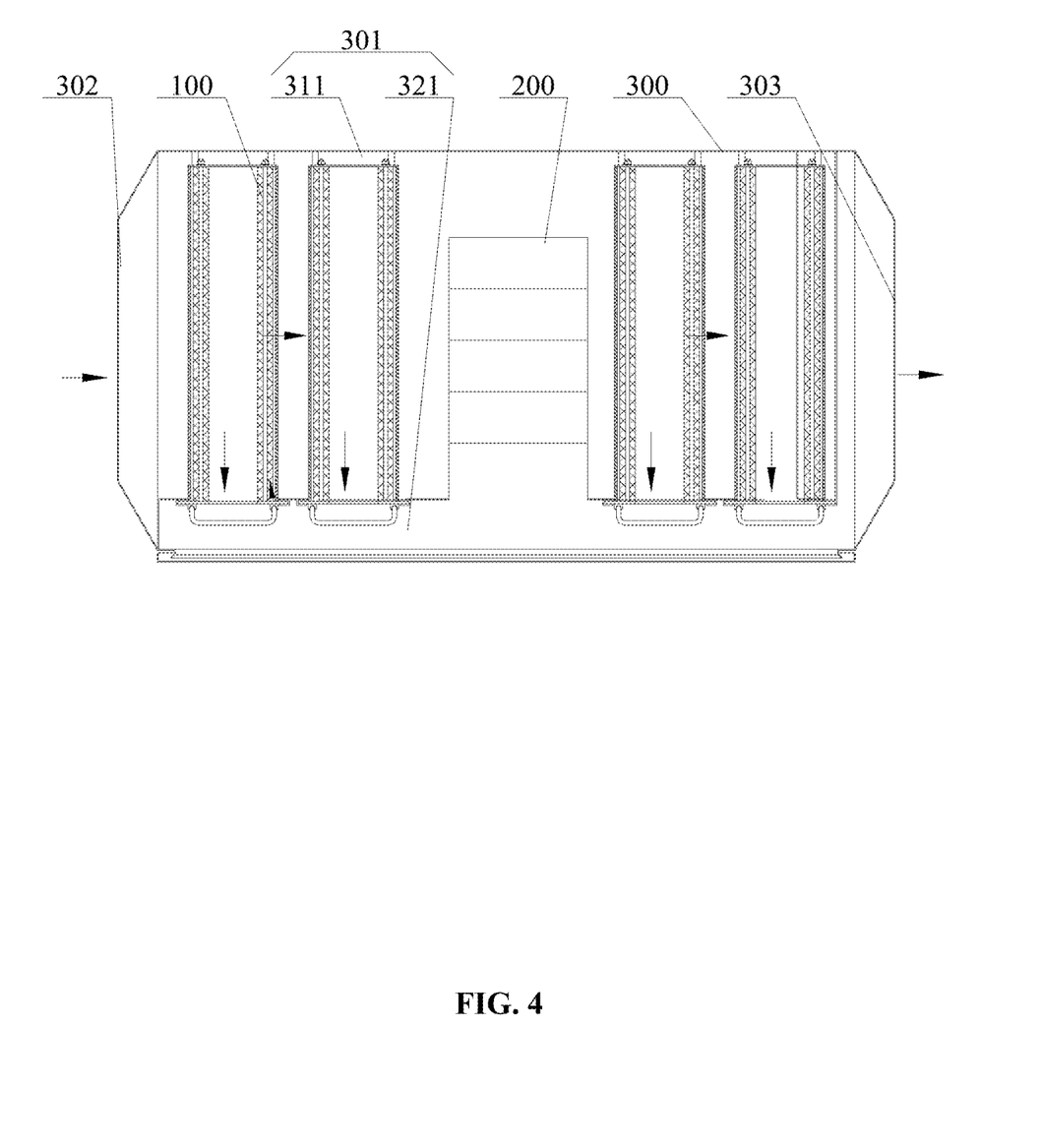
FIG. 4 is a schematic sectional view of another exemplary structure of the integrated device for adsorptive purification and catalytic regeneration of VOCs according to the embodiment of FIG. 2, along the A-A direction.

In this embodiment, to mount the filtration adsorption coupling filters 100, the multiple filter mounting holes are formed in the first inner cavity 311 of the housing 300, and filter guide rails are arranged in the filter mounting holes, so that the filtration adsorption coupling filters 100 are mounted inside the filter mounting holes by using the filter guide rails.

The first inner cavity 311 is used as the accommodating space for the filter mounting hole, and the other region of the first inner cavity 311 is the second inner cavity 321. The second inner cavity 321 is communicated with the combustion inner cavity. The second inner cavity 321 is used to circulate the adsorbed gas after the filtration adsorption coupling filters 100 in the first inner cavity 311 adsorb VOC exhaust gas; or the second inner cavity 321 is used to circulate gases when the catalytic combustion regeneration box 200 in the combustion inner cavity catalytically combusts and purifies the VOC exhaust gas.

Optionally, a flue gas check valve may be arranged at the air inlet 302, and an electric exhaust valve may be arranged at the air outlet 303, where the flue gas check valve may be a smoke exhaust fire damper.

In a preferred embodiment of the present disclosure, the catalytic combustion regeneration box 200 includes a box body 201, a recycling fan 202 and a regeneration mechanism 203. The regeneration mechanism 203 is located in the box body 201. A catalyst is arranged in the regeneration mechanism 203. The regeneration mechanism 203 is used to heat the catalyst and VOC exhaust gas, so as to perform thermal desorption and regeneration on the filtration adsorption coupling filter 100 via the heated VOC exhaust gas, and catalytically combust and decompose the VOC exhaust gas via the heated catalyst. The recycling fan 202 is located outside the housing 300, and the recycling fan 202 is communicated with the inside of the box body 201 to convey desorbed VOC exhaust gas into the box body 201.

Optionally, the box body 201 may be made of steel or stainless steel, where the recycling fan 202 is used for the circulation and conveyance between the box body 201 and the filtration adsorption coupling filter 100.

In a preferred embodiment of the present disclosure, the regeneration mechanism 203 includes an electric heating mechanism 213 and a catalytic combustion section 223. The electric heating mechanism 213 and the catalytic combustion section 223 are arranged in series at an interval. The electric heating mechanism 213 is used to heat the catalytic combustion section 223.

In a preferred embodiment of the present disclosure, the catalytic combustion section 223 includes multiple catalytic combustion layers. The electric heating mechanism 213 is arranged between any two catalytic combustion layers. The outside of the catalytic combustion layers is coated with the catalyst.

In this embodiment, the catalytic combustion layer may use foam ceramics and honeycomb ceramics as a carrier, and the carrier is coated with a VOC low-temperature combustion catalyst, where the catalyst may be a VOC catalyst such as a noble metal or transition metal oxide. The working temperature of the catalyst ranges from 200° C. to 400° C. Under the action of the catalyst, the VOCs regenerated and thermally desorbed are decomposed into $CO_2$ and $H_2O$ under low temperature conditions of 200° C.-400° C., which can not only purify hydrocarbon exhaust gas, but also remove malodorous odors.

Optionally, the electric heating mechanism 213 may be an electric heating wire.

In this embodiment, the regeneration mechanism 203 is used to heat the catalyst and the exhaust gas. The regeneration mechanism 203 can heat recycling gases when under an operating condition of desorption regeneration, so as to perform thermal desorption on the filtration adsorption coupling filter 100 by using the hot gases, and can heat the catalyst to make the catalyst reach a catalytic combustion temperature. When VOCs start to combust under the action of the catalyst and can maintain a thermal reaction temperature, the heating is automatically stopped. The thermal desorption temperature is gradually increased by using the combustion heat of the VOCs in the exhaust gas. When the filtration adsorption coupling filter 100 uses activated carbon as a filter of an adsorbent, the hot gases may be heated to about 100° C., and the maximum temperature of the hot gases does not exceed 120° C. When the filtration adsorption coupling filter 100 uses a molecular sieve as the filter of the adsorbent, the hot gases may be heated to about 120° C., and the maximum temperature of the hot gases does not exceed 150° C.

In a preferred embodiment of the present disclosure, the integrated device for adsorptive purification and catalytic regeneration of VOCs further includes a check valve 204, which is located at an outlet of the box body 201, and is used to limit a conveying direction of the catalytic combustion regeneration box 200 to the filtration adsorption coupling filter 100.

Optionally, the check valve 204 may be a wing valve, and a valve plate of the wing valve may be sealed unidirectionally under the action of gravity and negative pressure, so as to limit a conveying direction of the catalytic combustion regeneration box 200 to the filtration adsorption coupling filter 100.

In a preferred embodiment of the present disclosure, the integrated device for adsorptive purification and catalytic regeneration of VOCs further includes a fireproof heat exchange section 205. The fireproof heat exchange section 205 is located inside the box body 201 and between the check valve 204 and the catalytic combustion section 223.

Optionally, the fireproof heat exchange section 205 may be a tubular heat exchange thermal insulation layer.

In this embodiment, when the catalytic combustion regeneration box 200 is in operation, it is under an operating condition of desorption regeneration. A desorption regeneration cycle is as follows: an outlet of the recycling fan 202→the regeneration mechanism 203 (VOCs purification)→the fireproof heat exchange section 205→the check valve 204→the filter inner cavity 301 in the housing 300→the filtration adsorption coupling filter 100 (VOCs desorption)→an inlet of the recycling fan 202.

In addition, in a preferred embodiment of the present disclosure, the integrated device for adsorptive purification and catalytic regeneration of VOCs further includes an exhaust fan. The exhaust fan is arranged in the housing 300. The exhaust fan can ensure that a VOCs gas to be purified is conveyed in a direction from the air inlet 302 to the air outlet 303 along an output direction of the exhaust fan.

Figure 7:
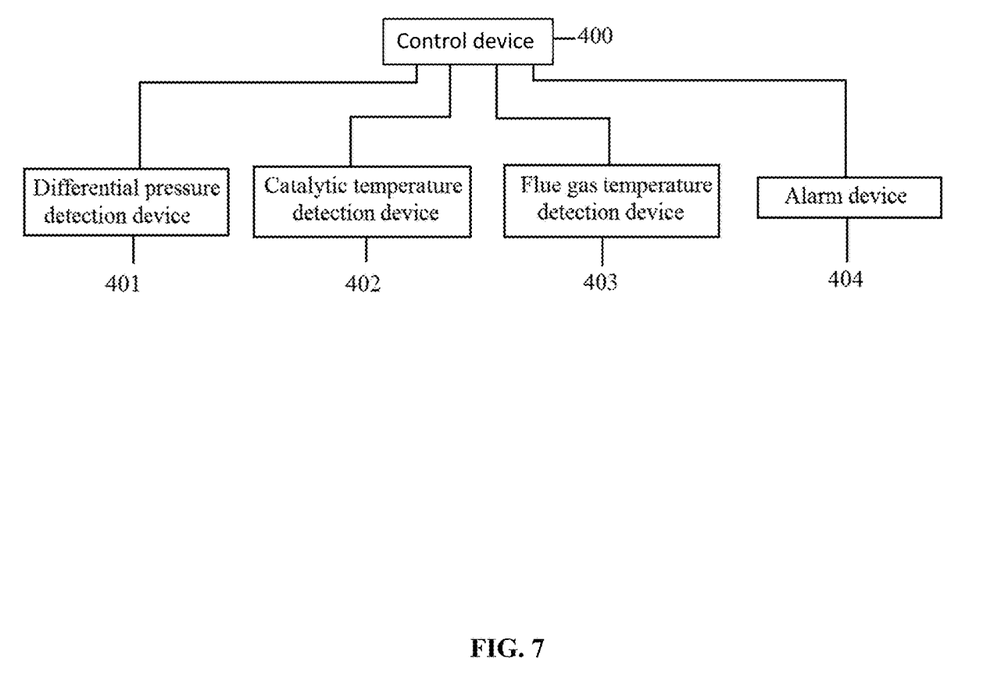
FIG. 7 is a schematic diagram of a control device is respectively connected with a differential pressure detection device, a catalytic temperature detection device, a flue gas temperature detection device and an alarm device via electrical signals according to an embodiment of the present disclosure.

In a preferred embodiment of the present disclosure, the integrated device for adsorptive purification and catalytic regeneration of VOCs further includes a control device 400, a differential pressure detection device 401, a catalytic temperature detection device 402, a flue gas temperature detection device 403 and an alarm device 404. The differential pressure detection device 401, the catalytic temperature detection device 402, the flue gas temperature detection device 403 and the alarm device 404 are respectively connected to the control device 400 via electrical signals. The differential pressure detection device 401 is arranged in the filter inner cavity 301 and located at an air outlet end of the filtration adsorption coupling filter 100 to detect and output a signal on a pressure drop difference in the filter inner cavity 301 to the control device 400. The flue gas temperature detection device 403 is arranged at an air outlet end of the filter inner cavity 301 to measure a temperature of the exhaust gas and transmit the information for the temperature of exhaust gas to the control device 400. The catalytic temperature detection device 402 is arranged at an air outlet end of the combustion inner cavity to measure a temperature of the catalyst and transmit information for the temperature of the catalyst to the control device 400. The control device 400 is connected to the catalytic combustion regeneration box 200 and the alarm device 404 via electrical signals. The control device 400 is configured to correspondingly control states of the catalytic combustion regeneration box 200 and the alarm device 404 according to the signal on the pressure drop difference in the filter inner cavity 301 and the information for the temperature of exhaust gas.

In this embodiment, when the exhaust gas temperature is greater than 150° C., the control device 400 starts the exhaust fan to discharge high-temperature regeneration exhaust gas to prevent the activated carbon catalyst from igniting and avoid fire accidents. The control device 400 is configured to control a state of the exhaust fan or the alarm device 404 according to signals respectively output from the differential pressure detection device 401, the catalytic temperature detection device 402 and the flue gas temperature detection device 403.

Optionally, multiple types of control devices 400 may be provided, for example: a MCU, a computer and a PLC, etc. Preferably, the control device 400 is an MCU. A microcontroller unit (MCU), also known as single-chip microcomputer, is formed by appropriately reducing the frequency and specifications of a central processing unit, and integrating a memory, a counter, a USB, an A/D converter, a UART, a PLC, a DMA and other peripheral interfaces and even an LCD drive circuit on a single chip to form a chip-level computer, to perform different control combinations for different applications.

Preferably, the control device 400 is an STM32F103C8T6 single-chip microcomputer, which has strong processing capability and abundant internal resources and operates stably.

Optionally, the alarm device 404 may be an acousto-optic alarm device.

Optionally, the differential pressure detection device may be a differential pressure sensor. Both the catalytic temperature detection device 402 and the flue gas temperature detection device 403 each may be a temperature sensor.

In this embodiment, the integrated device for adsorptive purification and catalytic regeneration of VOCs has two operating conditions, which are cycled in a time-sharing manner:

Operation condition 1: under an operation condition of adsorptive purification of VOCs, the exhaust fan is normally started, the flue gas check valve in front of the first inner cavity 311 and the electric exhaust valve at the air outlet 303 are opened, and purified exhaust gas passes through the air inlet 302, the first inner cavity 311, the filtration adsorption coupling filter 100, the second inner cavity 321 and the air outlet 303 and is discharged through the air outlet 303.

Operating condition 2: in a desorption and catalytic regeneration state, the exhaust fan is shut down or operated at a small gases volume, the flue gas check valve is closed or slightly opened, the electric exhaust valve is slightly opened or closed, the recycling fan 202 is started, and the electric heating mechanism 213 is started to preheat gases in the catalytic combustion section 223 and the box body 201, and the regeneration cycle volume may be 5%-20% of the exhaust gases volume. The recycling gases is catalytically combusted and purified, the generated heat heats the gases in the housing 300 again, and the gases are gradually heated up for desorption, so that VOCs adsorbed by the filtration adsorption coupling filter 100 are desorbed by using the hot gases. After multiple cycles of purification in the housing 300, on-site regeneration is performed on the filtration adsorption coupling filter 100, and the desorbed exhaust gas is purified and then discharged.

Finally, it should be noted that the above-mentioned embodiments are only used to illustrate the technical solutions of the present disclosure, rather than constituting a limitation thereto. Although the present disclosure has been described in detail with reference to the above-mentioned embodiments, it should be understood by a person of ordinary skill in the art that he/she may still modify the technical solutions described in the above-mentioned embodiments or equivalently replace some or all technical features therein. These modifications or replacements do not make the essence of the corresponding technical solutions depart from the scope of the technical solutions of various embodiments of the present disclosure.

What is claimed is:

1. An integrated device for adsorptive purification and catalytic regeneration of volatile organic compounds (VOCs), comprising:
    a filtration adsorption coupling filter,
    a catalytic combustion regeneration box,
    a housing,
    a control device,
    a differential pressure detection device,
    a catalytic temperature detection device,
    a flue gas temperature detection device, and
    an alarm device,
    wherein
    the housing comprises a filter inner cavity and a combustion inner cavity that are communicated in sequence, the housing is used for closed circulation of VOC exhaust gas, the filtration adsorption coupling filter is arranged in the filter inner cavity; the filtration adsorption coupling filter is configured to adsorb and filter the VOC exhaust gas, and the catalytic combustion regeneration box is located in the combustion inner cavity and configured to perform thermal desorption and regeneration on the filtration adsorption coupling filter and catalytically combust and purify the VOC exhaust gas obtained by the thermal desorption;
    the differential pressure detection device, the catalytic temperature detection device, the flue gas temperature detection device and the alarm device are connected to the control device via electrical signals, the differential pressure detection device is arranged in the filter inner cavity and located at an air outlet end of the filtration adsorption coupling filter and configured to detect and output a signal on a pressure drop difference in the filter inner cavity to the control device, the flue gas temperature detection device is arranged at an air outlet end of the filter inner cavity and configured to measure a temperature of exhaust gas and transmit information for a temperature of exhaust gas to the control device, and the catalytic temperature detection device is arranged at an air outlet end of the combustion inner cavity and configured to measure a temperature of a catalyst and transmit information for a temperature of the catalyst to the control device; and
    the control device is connected to the catalytic combustion regeneration box and the alarm device via electrical signals, and the control device is configured to control states of the catalytic combustion regeneration box and the alarm device according to the signal on the pressure drop difference in the filter inner cavity and the information for the temperature of exhaust gas.

2. The integrated device for adsorptive purification and catalytic regeneration of VOCs according to claim 1, wherein
the housing further comprises an air inlet and an air outlet; and
the air inlet is communicated with the filter inner cavity; the air inlet is configured to convey received VOC exhaust gas to the filter inner cavity; the air outlet is communicated with the combustion inner cavity; the air outlet is configured to discharge a gas that flows through the filtration adsorption coupling filter and the catalytic combustion regeneration box so as to be purified.

3. The integrated device for adsorptive purification and catalytic regeneration of VOCs according to claim 1, wherein
the catalytic combustion regeneration box comprises a box body, a recycling fan and a regeneration mechanism;
the regeneration mechanism is located in the box body, a catalyst is arranged in the regeneration mechanism, and the regeneration mechanism is configured to heat the catalyst and the VOC exhaust gas, so as to perform thermal desorption and regeneration on the filtration adsorption coupling filter via heated VOC exhaust gas, and catalytically combust and decompose the VOC exhaust gas via the heated catalyst; and
the recycling fan is located outside the housing, and the recycling fan is communicated with an inside of the box body, and is configured to convey desorbed VOC exhaust gas into the box body.

4. The integrated device for adsorptive purification and catalytic regeneration of VOCs according to claim 3, wherein
the regeneration mechanism comprises an electric heating mechanism and a catalytic combustion section; and
the electric heating mechanism and the catalytic combustion section are arranged in series at an interval, and the electric heating mechanism is configured to heat the catalytic combustion section.

5. The integrated device for adsorptive purification and catalytic regeneration of VOCs according to claim 4, wherein
the catalytic combustion section comprises a plurality of catalytic combustion layers;
the electric heating mechanism is arranged between any two catalytic combustion layers of the plurality of catalytic combustion layers; and
outsides of the plurality of catalytic combustion layers are coated with the catalyst.

6. The integrated device for adsorptive purification and catalytic regeneration of VOCs according to claim 5, further comprising a check valve, wherein
the check valve is located at an outlet of the box body; the check valve is configured to limit a conveying direction from the catalytic combustion regeneration box to the filtration adsorption coupling filter.

7. The integrated device for adsorptive purification and catalytic regeneration of VOCs according to claim 6, further comprising a fireproof heat exchange section, wherein
the fireproof heat exchange section is located inside the box body and between the check valve and the catalytic combustion section.

8. The integrated device for adsorptive purification and catalytic regeneration of VOCs according to claim 1, wherein
the filtration adsorption coupling filter comprises a filter body and an adsorption filtration mechanism;
the adsorption filtration mechanism is arranged inside the filter body and configured to adsorb and filter the VOC exhaust gas; and
the adsorption filtration mechanism comprises a first fixing mesh, an adsorption filtration layer and a second fixing mesh that are sequentially connected; and the adsorption filtration layer is located between the first fixing mesh and the second fixing mesh.

9. The integrated device for adsorptive purification and catalytic regeneration of VOCs according to claim 1, wherein
the filter inner cavity comprises a first inner cavity and a second inner cavity that are communicated with each other,
the housing comprises an air inlet and an air outlet,
an inlet of the first inner cavity is communicated with the air inlet,
an outlet of the second inner cavity is communicated with the air outlet;
the housing is internally provided with a plurality of filter mounting holes corresponding to the first inner cavity,
the filtration adsorption coupling filter comprises a plurality of filtration adsorption coupling filters; and
the filtration adsorption coupling filters are mounted in the filter mounting holes in a one-to-one correspondence mode, so that VOCs to be purified enter from the air inlet, pass through the plurality of filtration adsorption coupling filters, then flow through the second inner cavity and are discharged through the air outlet.

* * * * *